(12) United States Patent
Topchy et al.

(10) Patent No.: US 9,659,105 B2
(45) Date of Patent: May 23, 2017

(54) METHODS AND APPARATUS TO TRACK WEB BROWSING SESSIONS

(75) Inventors: Alexander Topchy, New Port Richey, FL (US); Jan Besehanic, Tampa, FL (US)

(73) Assignee: The Nielsen Company (US), LLC, New York, NY (US)

( * ) Notice: Subject to any disclaimer, the term of this patent is extended or adjusted under 35 U.S.C. 154(b) by 1066 days.

(21) Appl. No.: 13/421,613

(22) Filed: Mar. 15, 2012

(65) Prior Publication Data

US 2013/0246609 A1 Sep. 19, 2013

(51) Int. Cl.
G06F 15/16 (2006.01)
G06F 17/30 (2006.01)

(52) U.S. Cl.
CPC ............... *G06F 17/30899* (2013.01)

(58) Field of Classification Search
CPC ................................................ G06F 17/30899
USPC ........ 709/224, 201, 228; 713/171, 155, 185; 726/6
See application file for complete search history.

(56) References Cited

U.S. PATENT DOCUMENTS

| | | | |
|---|---|---|---|
| 6,115,742 A | 9/2000 | Franklin et al. | |
| 6,381,629 B1 * | 4/2002 | Lee | 709/201 |
| 7,035,926 B1 | 4/2006 | Cohen et al. | |
| 7,885,901 B2 | 2/2011 | Hull et al. | |
| 8,554,779 B1 * | 10/2013 | Batali | 707/757 |
| 2003/0149900 A1 * | 8/2003 | Glassman et al. | 713/202 |
| 2006/0265495 A1 | 11/2006 | Butler et al. | |
| 2006/0274659 A1 * | 12/2006 | Ouderkirk | 370/241 |
| 2008/0221987 A1 * | 9/2008 | Sundaresan et al. | 705/14 |
| 2008/0224832 A1 * | 9/2008 | Tamukai | G06K 7/0008 340/10.51 |
| 2008/0235368 A1 * | 9/2008 | Nagaraj et al. | 709/224 |
| 2009/0089420 A1 | 4/2009 | Caruso et al. | |
| 2009/0125719 A1 * | 5/2009 | Cochran et al. | 713/171 |
| 2009/0265460 A1 | 10/2009 | Balasubramanian et al. | |
| 2010/0327054 A1 * | 12/2010 | Hammad | 235/375 |
| 2011/0040871 A1 | 2/2011 | Neal | |
| 2011/0137904 A1 | 6/2011 | Rajaram et al. | |
| 2011/0145398 A1 | 6/2011 | Bansal et al. | |
| 2011/0270676 A1 * | 11/2011 | Vassilvitskii | G06Q 30/0251 705/14.49 |
| 2013/0035979 A1 * | 2/2013 | Tenbrock | 705/7.29 |

OTHER PUBLICATIONS

Gutterman et al., "Hold Your Sessions: An Attack on Java Session-Id Generation," Topics in Cryptology, Proceedings of the Cryptographers' Track at the RSA Conference 2005, San Francisco, CA, USA, Feb. 14-18, 2005, vol. 3376, Series Lecture Notes in Computer Science (14 pages).

* cited by examiner

Primary Examiner — Thuong Nguyen
(74) Attorney, Agent, or Firm — Hanley, Flight & Zimmerman, LLC

(57) ABSTRACT

Methods and apparatus to tracker web browsing sessions are disclosed. An example method includes computing a sequence of numbers to be generated by a random number generator during a first browsing session associated with a browser given a first seed value; and determining whether a web site visit is associated with the first browsing session based on a received number.

11 Claims, 10 Drawing Sheets

METHODS AND APPARATUS TO TRACK WEB BROWSING SESSIONS

FIELD OF THE DISCLOSURE

This disclosure relates generally to audience measurement and, more particularly, to methods and apparatus to track web browsing sessions.

BACKGROUND

Internet traffic data related to user requests for online resources, such as web pages, is valuable to media providers, advertisers, manufacturers, retailers, service providers, security entities, information technology professionals, etc. For example, some audience measurement entities provide monitoring services to gather information regarding which online resources were visited (e.g., requested) by a particular user or group (e.g., demographic) of users over a particular period of time. On the other hand, some monitoring services determine how many visitations (e.g., requests for data) one or more online resources received over a period of time without regard to an identification of the respective visitors or corresponding machines. Monitoring services collect additional and/or alternative types, amounts, and/or granularities of internet traffic data and provide the data to interested entities, typically in exchange for consideration (e.g., a fee). For example, many clients pay one or more audience measurement entities for data related to Internet traffic. The clients use the data to, for example, develop an advertisement campaign strategy, demonstrate results to their own clients, verify compliance with an agreement, etc.

DETAILED DESCRIPTION

Figure 1:
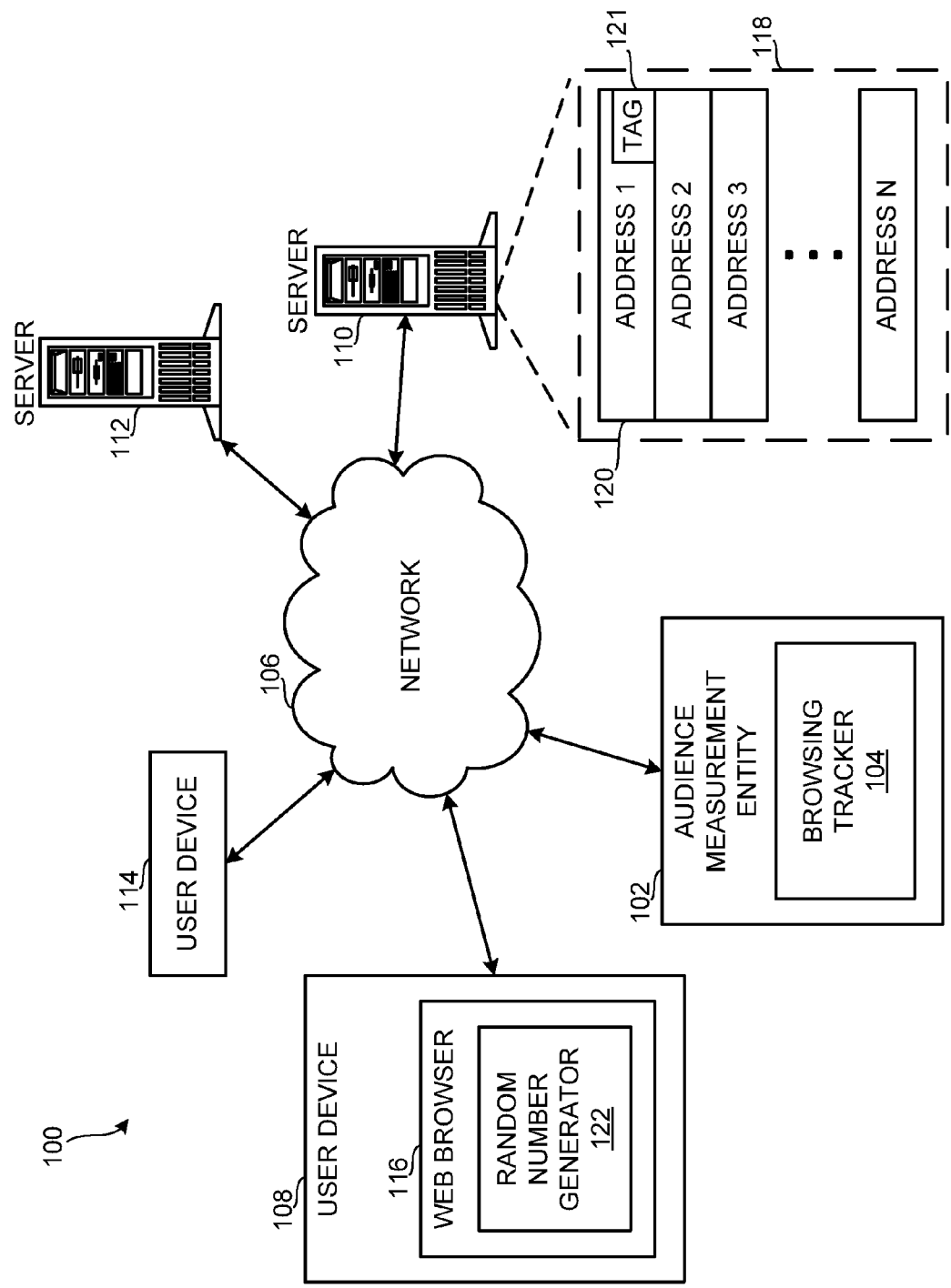
FIG. 1 is an illustration of an example system to be monitored by an example audience measurement entity including an example browsing tracker disclosed herein.

Audience measurement entities provide known monitoring services that collect data related to, for example, communications between user devices and/or online resource(s) over one or more networks, such as the Internet. Example communications of interest to such known monitoring services include data requests sent from a web browser implemented on a user device to a server that hosts one or more online resources, such as web page(s) and/or advertisements to be inserted in web page(s). Known monitoring services gather information related to such data requests and/or other types of communications indicative of, for example, how many times an online resource was accessed (e.g., was downloaded, received a request for media, etc.), when (e.g., times and/or dates) an online resource was accessed, identit(ies) associated with the user device(s) and/or user(s) that accessed an online resource, a manner in which a particular user device or group of devices accessed one or more online resources, etc. In some instances, known monitoring services attempt to identify particular browsing sessions performed by a browser of a user device, media requested during the browsing session, and/or an order in which the media was requested. As described in detail below, example methods, apparatus, and articles of manufacture disclosed herein enable gathering of such data related to browsing sessions without being thwarted by, for example, security configurations of a browser and/or other browser limitations.

Previous techniques utilized by known monitoring services include, for example, accessing cookies and/or Internet protocol (IP) address identifiers, which are often used to identity user devices communicating over a network (e.g., the Internet) and/or to track browsing sessions conducted by the identified user devices. Utilization of cookies and/or IP addresses center around the concept of assigning an identifier to a user device and, in some instances, locally storing the identifier (and other identifying information associated with accessed web media) on the corresponding user device. However, these and other monitoring techniques that involve storing a user identifier on a user device may be thwarted by security measures installed on the user devices that prohibit local storage of the user identifier, thereby preventing known monitoring services from collecting online activity associated with the user devices. For example, cookies can be disabled, restricted by security measures, or otherwise unavailable. Further, cookies are often restricted to use within the domain at which they were set (e.g., Nielsen.com cookies are typically only accessible by servers in the Nielsen.com domain). In such instances, cookies are of limited value and/or cannot be utilized to track web browsing sessions conducted by a user device. Further, Internet protocol addresses are often difficult or impossible to track for some user devices. For example, an IP address assigned to a mobile device (e.g., a smartphone) having a web browser is often difficult to ascertain and/or track due to the use of proxy servers by the mobile device and/or an access point of a network over which the mobile device is configured to communicate. In such circumstances, IP addresses can be masked, making it difficult to use an IP address to identify a specific user device and/or to track a web browsing session. Further, IP addresses may be dynamic and, thus, may change over time.

Example methods, apparatus, and articles of manufacture disclosed herein enable tracking of web browsing sessions and collecting Internet traffic data associated with the browsing sessions without the use of cookies, without having to ascertain an IP address, and/or despite security measures that prevent local storage of a user identifier on user devices. Example methods, apparatus, and articles of manufacture disclosed herein utilize a random number generator (RNG) native to a web browser implemented on a user device and knowledge of an operation of the RNG to identify web browsing sessions implemented on the user device and media visited during the browsing sessions. As used herein, a browsing session is defined to be a time period beginning with the usage of a browser to access an online resource (which may or not have been viewed) and ending with the user ceasing to use the browser (e.g., closing the browser) irrespective of how many online resources are accessed in that time. Example methods, apparatus, and articles of manufacture disclosed herein recognize that sequences of numbers generated by the RNG are not truly random. Rather, given a particular seed value, the numbers and the sequence of the numbers generated by the RNG are predictable. That is, each time the RNG is given the same particular seed value, the RNG will generate the same sequence of numbers. Thus, the randomness of the RNG is actually provided by the randomness of the assignment of the seed value.

Example methods, apparatus, and articles of manufacture disclosed herein take advantage of the predictability of the RNG to identify browsing sessions implemented by web browsers of user devices which, for example, have cookies blocked thereon. Examples disclosed herein provide instructions to a web browser in response to the web browser visiting a tagged network address, such as a web page having the instructions embedded in media of the web page. Alternatively, the tagged web page may have a beacon embedded therein that points to the instructions provided by the examples disclosed herein. Once downloaded onto the web browser, the instructions cause the web browser to seed an RNG of the web browser with a known seed value. Unlike executable monitoring instructions embedded in a web page, the seeding of the RNG persists throughout a browsing session and, in some examples, into subsequent browsing session(s). That is, monitoring instructions provided to the browser in response to the browser visiting a first page of a web page in accordance with the techniques disclosed in Blumenau, U.S. Pat. No. 6,108,637, do not persist on the browser when, for example, the first web page is closed. Further, any cookie set in the first domain is not accessible in a different domain. Moreover, if the settings of the user device are set in a certain manner, cookies may be rejected and/or not stored on the user device. On the other hand, when a browser is provided with a seed value via the instructions provided by the examples disclosed herein, the RNG of the browser generates random numbers according to the provided seed value throughout the browsing session despite the browser visiting different network addresses and/or different domains and irrespective of whether cookies are accepted by the user device.

Examples disclosed herein take advantage of the persistence of the RNG seed value and knowledge of the sequence of numbers that will be generated by the RNG given the provided seed value to track Internet resources (e.g., web sites) visited during a browsing session. In some such examples, the instructions provided to the web browser in response to the web browser visiting a tagged network address cause the web browser to generate a random number and to convey the random number to a monitoring server. Further, the instructions provided by the examples disclosed herein cause the web browser to convey an identifier of the requested network address to the monitoring server in conjunction with the RNG output. Thus, during a web browsing session, when a web browser receives a web page that includes (e.g., is tagged with) the instructions disclosed herein or a link pointing to the instructions disclosed herein, the instructions cause the web browser to transmit, to a monitoring server, an identifier of the network address for the web page and a sequential output of the RNG based on a seed provided during that web browsing session.

In accordance with the examples disclosed herein, the monitoring server calculates and/or is made aware of the sequence of numbers that will be generated by the RNG when seeded with the seed value provided to the browser. Examples disclosed herein enable use of the expected sequence of random numbers in conjunction with the RNG outputs and network address identifiers received from the browsers to identify groups of network address that were visited during a same web browsing session. Additionally, examples disclosed herein group together received RNG outputs belonging to the same expected random number sequence. As the RNG outputs are received along with network addresses, the network addresses are also grouped together. Examples disclosed herein are able to group the network addresses in a chronological order in which the network addresses were visited because the corresponding RNG outputs are generated in a known sequence.

Thus, users of examples disclosed herein (e.g., audience measurement entities providing monitoring services) are able to identify network addresses visited during a browsing session and the order in which the identified network addresses were visited without the use of cookies, without having to ascertain an IP address, and/or despite security measures that prevent monitoring services to locally store a user identifier on user devices.

An example audience measurement entity 102 having a browsing tracker 104 constructed in accordance with teachings of this disclosure is shown in FIG. 1. In the example of FIG. 1, the browsing tracker 104 is to monitor activity or traffic associated with a network 106. In particular, the browsing tracker 104 of FIG. 1 is to track browsing sessions in which user devices request and/or access online resource(s) tagged with data associated with the example audience measurement entity 102, such as web page(s) having a tag embedded therein provided by the example browsing tracker 104. For purposes of illustration, the example of FIG. 1 includes a first user device 108, a second user device 114, a first server 110, and a second server 112. However, the network 106 is in communication with many more user devices, servers, etc. In the illustrated example, the browsing tracker 104 is described as tracking browsing sessions conducted by the first user device 108 in which a web browser 116 of the first user device 108 requests tagged online data from the first and/or second servers 110, 112 and/or browsing sessions conducted by a browser of the second user device 114 including requests and/or accesses of tagged online data managed by the first and/or second servers 110, 112. However, browsing sessions of any other user device(s) involving requests and/or accesses of the first or second servers 110, 112 or any other tagged online resources may additionally or alternatively be tracked. For example, when the web browser 116 of the first user device 108 submits one or more requests to the first server 110 for data associated with one of a plurality of addresses 118 hosted by the first server 110 during a browsing session (e.g., during the time interval between an opening and a closing of an instance of the web browser 116), the example browsing tracker 104 of FIG. 1 identifies visits to tagged one(s) of the addresses 118 occurring during the browsing session, determines that the visits to the tagged one(s) of the addresses 118 occurred during the same browsing session, and stores indications of the visits in chronological order in which the tagged addresses 118 were visited. Some or all of the addresses 118 may be within the same domain and/or some of the addresses 118 may be in different domains. In the illustrated example, each one of the addresses 118 is identifiable by a resource identifier (e.g., a universal resource locator (URL)) and corresponds to an online resource, such as a web page, an advertisement, media, content, and/or any other type of data. The second server 112 and/or any additional servers of the example system 100 also include addresses that are accessible by user device(s) (e.g., the first and second user devices 108 and 114) to obtain respective online resource(s). While FIG. 1 shows the first user device 108 including an example web browser 116, the first user device 108 can include a plurality of different web browsers and/or the second user device 114 can include one or more web browsers. In the illustrated example of FIG. 1, the user devices 108 and 114 may be stationary or portable computers, handheld computing devices (e.g., iPods®), smart phones (e.g., iPhones®), tablets (e.g., iPads®), Internet appliances, or any other type of device that may be connected to the Internet. Moreover, the example browsing tracker 104 of FIG. 1 can monitor any number of user devices and/or online resources.

When the web browser 116 of the first user device 108 requests (e.g., via a hyper-text transfer protocol (HTTP) and/or any other suitable protocol) data from one of the addresses 118 hosted by the first server 110, the first server 110 responds to the request with data associated with the address, such as a web page, media, content, an advertisement, etc. When the requested data corresponds to a web page, media, content, or an advertisement, for example, the browser 116 renders the data on corresponding media presentation device(s) (e.g., a display and/or an audio playback device). In the illustrated example, at least the first address 120 (e.g., ADDRESS 1) corresponds to data that has been tagged with a tag 121. The example tag 121 of FIG. 1 includes instructions disclosed herein and described in greater detail below that enable the example browsing tracker 104 to track browsing sessions. Accordingly, the instructions disclosed herein are downloaded to the first user device 108 when the browser 116 visits the tagged first address 120 at about the same time the browser 116 renders the requested data. Alternatively, the example tag 121 can include beacon code pointing to a server (e.g., a server managed by the audience measurement entity 102) storing the instructions disclosed herein and described in greater detail below that enable the example browsing tracker 104 to track browsing sessions. In such instances, the beacon code of the tag 121 may be configured in accordance with teachings of Blumenau in U.S. Pat. No. 6,108,637, filed on Sep. 3, 1996 (referred to herein as "the Blumenau patent"), which is hereby incorporated herein by reference in its entirety. In the illustrated example, when the tag 121 includes beacon code configured in accordance with Blumenau, the tag 121 causes the web browser 116 to request (e.g., via an Hyper Text Transfer Protocol (HTTP) request or port statement) the instructions disclosed herein from a server associated with the audience measurement entity 102, which responds with the instructions to, for example, generate a number with the RNG as explained below.

The audience measurement entity 102 of FIG. 1 may work cooperatively with one or more media providers (e.g., amazon.com, cnn.com, etc.) to embed a tag, such as the tag 121 of FIG. 1, in data managed by the database proprietors to cause browsers using the tagged data to contact a server of the audience measurement entity 102. A web page including such a tag is referred to herein as a tagged web page because it has been tagged with the instructions disclosed herein to cause interaction with the browsing tracker 104 and/or beacon code pointing to the instructions disclosed herein to cause interaction with the browsing tracker 104. When the example browser 116 of FIG. 1 requests the web page at the first address 120, both the web page and the tag 121 are downloaded to the first user device.

In the illustrated example of FIG. 1, the instructions provided to the browser 116 via the tag 121 cause the browser 116 to convey information regarding the access to the media of the first address 120 to the audience measurement entity 102. For example, the instructions provided via the tag 121 can cause the browser 116 to send an HTTP request that includes media identifying information (e.g., an identifier associated with the first address 120) as, for example, a payload of the HTTP request. The example audience measurement entity 102 of FIG. 1 did not provide the media to the client and is a trusted third party for providing accurate usage statistics, such as The Nielsen Company, LLC. Because the instructions are associated with the accessed media obtained via the first address 120, the instructions will be executed by the browser 116 whenever the media is accessed. As a result, the media identifying information is provided to the audience measurement entity 102 irrespective of whether a user associated with the first user device 108 is a panelist of the audience measurement entity 102 and irrespective of whether the media is retrieved locally from a cache (e.g., on a second or subsequent access that does not actually re-retrieve the data from the server).

In some prior systems, the media identifying information conveyed to the audience measurement entity includes a cookie from the user device 108. If no such cookie was provided, the audience measurement entity using the prior system attempts to set a cookie to identify the user in subsequent visits. Additionally or alternatively, previous systems cause the browser 116 to convey a unique identifier stored on the first user device 108 to a server associated with the audience measurement entity. Additionally or alternatively, previous systems ascertain an IP address associated with first user device 108 and convey the IP address to the server associated with the audience measurement entity. The example browsing tracker 104 of FIG. 1 enables the example audience measurement entity 102 to obtain web browsing information from the first user device 108 even when cookies, unique identifiers, IP addresses, and other items used in prior monitoring services are unavailable and/or prohibited from use on the first user device 108 and/or prohibited from conveyance to the audience measurement entity 102. As described in detail below, the example browsing tracker 104 utilizes a random number generator (RNG) 122 associated with the browser 116 and knowledge of a sequence of numbers that will be generated by the RNG 122 track web browsing sessions, to identify online media visited during the web browsing sessions of the corresponding browser 116, and to record an order in which the online media was visited.

Figure 2:
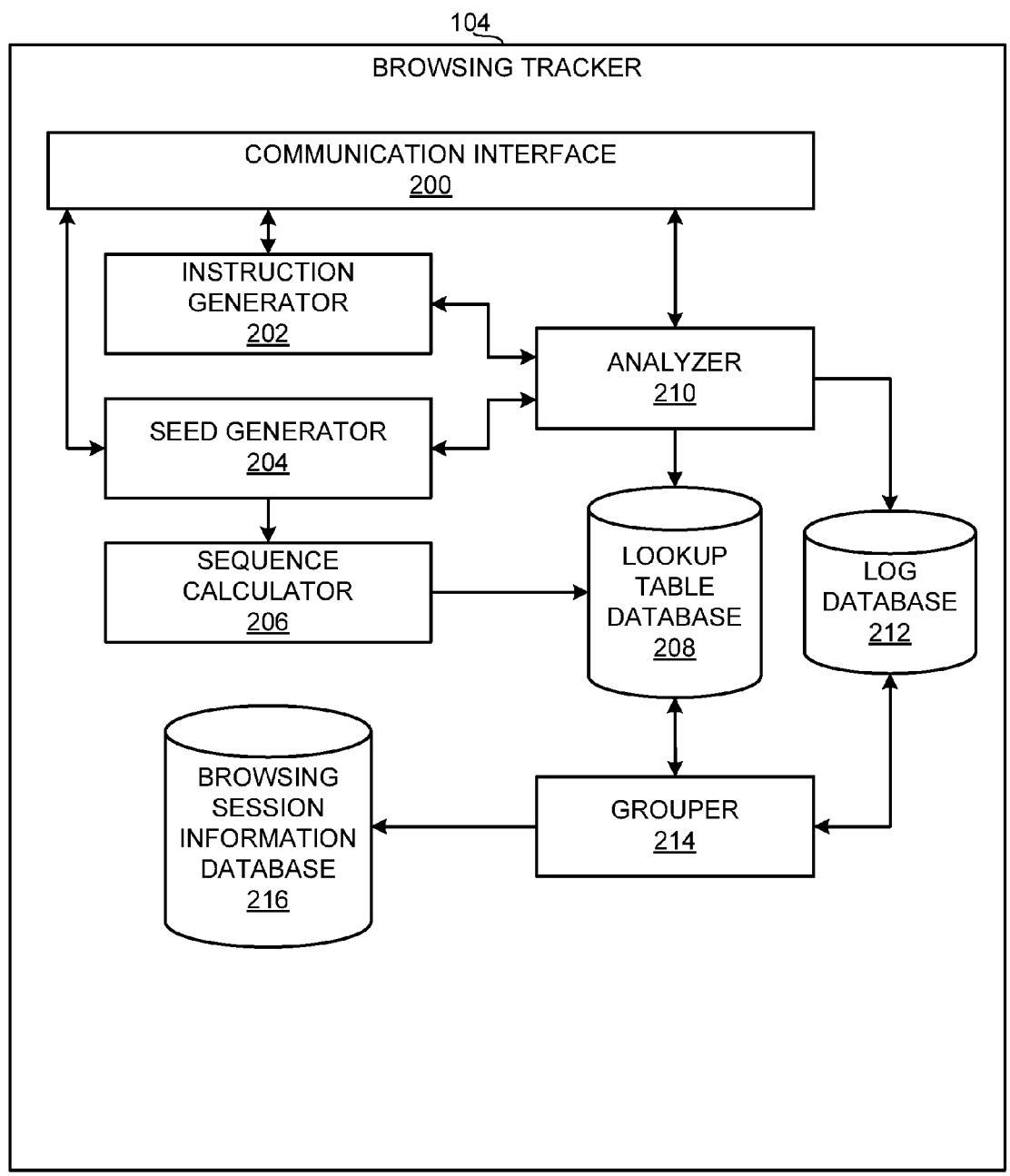
FIG. 2 is a block diagram of an example implementation of the example browsing tracker of FIG. 1.

FIG. 2 is a block diagram of an example apparatus that may implement the example browsing tracker 104 of FIG. 1. The example browsing tracker 104 includes a communication interface 200 to send and receive data via, for example, the network 106. For example, the communication interface 200 of FIG. 2 receives data, such as HTTP requests and the payloads of the HTTP requests, from the first and second user devices 108 and 114 of FIG. 1. The example communication interface 200 of FIG. 2 translates and/or formats data such that the browsing tracker 104 can communicate with a plurality of types of user devices and/or applications.

The example browsing tracker 104 of FIG. 2 includes an instruction generator 202 that generates instructions to be provided to a browser (e.g., the browser 116 of FIG. 1) in response to the browser accessing a tagged online resource (e.g., at the first address 120 of FIG. 1). In the illustrated example of FIG. 2, the audience measurement entity 102 provides the instructions generated by the instruction generator 202 to media providers that host online resources, such as an operator of the first server 110. In such instances, the operator of the first server 110, for example, tags one or more of the addresses 118 hosted at the first server 110 such that the instructions are delivered to the user device 108 when the browser 116 requests the media at any of the addresses 118 that include a tag (e.g., the tag 121 of FIG. 1 at the first address 120). For example, the tag 121 can be embodied as a Java applet, a Java script, instructions in the HTML of a web page hosted at the first address 120 such that the browser 116 downloads the embedded instructions associated with the tag 121 when downloading the web page from the first address 120. Alternatively, the instructions provided by the example instruction generator 202 can be delivered directly from the browsing tracker 104 to the browser 116 by including beacon code in the tag 121. In such instances, the browser 116 requests the media (e.g., a web page) from the server 110. Because the media is tagged, the browser 116 receives the requested media and instructions (in the tag 121) which cause the browser 116 to request the instructions from a server associated with the browsing tracker 104 (e.g., a server managed by the audience measurement entity 104 of FIG. 1). Whether the instructions are provided to the browser 116 directly via the tag 121 or indirectly via beacon code causing the browser 116 to retrieve the instructions for the browsing tracker 104, when the instructions provided by the instruction generator 202 are downloaded onto the user device 108, the browser 116 executes the instructions (e.g., by running a script or applet).

The instructions generated by the example instruction generator 202 of FIG. 2 cause the browser 116 to generate a random number by calling the RNG 122. Thus, each time the instructions provided by the example generator 202 of FIG. 2 are downloaded to the browser 116 (e.g., each time the browser 116 visits a page tagged with the instructions), the browser 116 calls the RNG 122. When the example RNG 122 of FIG. 1 is provided with a seed value, the RNG 122 uses the seed value in an initial iteration of a random number algorithm to produce a first output. A second execution of the RNG 122 uses the first output to generate a second output. A third execution of the RNG 122 uses the second output to generate a third output. This process can continue for any desired number or iterations or for a desired duration. In the illustrated example, the RNG 122 iterates in this fashion every time a tagged resource is access during a browsing session. That is, when the browser 116 visits a first tagged web page, the RNG 122 generates a first output. The generated first output is used in a second iteration of the RNG 122 performed when the browser 116 visits a second tagged web page. Accordingly, the example RNG 122 generates a sequence of random numbers based on a single seed value for each browsing session.

The instructions provided by the example instruction generator 202 of FIG. 2 also cause the browser 116 to send each output of the RNG 122 to the browsing tracker 104 (or any other server accessible by the audience measurement entity 102). Further, the instructions generated by the example instruction generator 202 of FIG. 2 cause the browser to send an address identifier (e.g., a URL) in conjunction with each output of the RNG 122. Thus, in response to the first user device 108 visiting a web page tagged with instructions provided by the example instruction generator 202 of FIG. 2 (or tagged with beacon code pointing to the instructions), the example browsing tracker 104 of FIG. 2 is provided with a number generated by the RNG 122 and an address identifier associated with the tagged web page. As described below, the example browsing tracker 104 of FIG. 2 analyzes this information to track browsing sessions, identify tagged online media visited during the tracked sessions, and the order in which tagged online media was visited during the tracked sessions.

The example browsing tracker 104 of FIG. 2 also includes a seed generator 204 that generates a seed value to be provided to the browser 116 in response to a detection of an initiation of a web browsing session. When an initiation of a browsing session is detected, the seed value generated by the seed generator 204 is provided to the browser 116 along with instructions to seed the RNG 122 with the seed value. An example manner in which the browsing tracker 104 determines that a browsing session has been initiated (e.g., a browser has opened and accessed a first online resource) is described in detail below. As described above, when the example RNG 122 of the browser 116 is seeded with a value, the RNG 122 bases each subsequent iteration performed during a current browsing session on the provided seed value. As a result, the RNG 122 generates a predictable (given knowledge of the seed value) sequence of numbers during a browsing session. Given a particular seed value (e.g., 561), the RNG 122 generates a particular sequence of numbers (e.g., 10845, 68754, 19358, etc.), one of which is generated each time the browser 116 visits a tagged online resource (e.g., an 118 of any Internet resource at any server including a tag similar to the tag 121 of the first address 120 of FIG. 1) in accordance with the instructions provided by the example instruction generator 202 of FIG. 2. If the RNG 122 is seeded again with that particular seed value (e.g., 561), the RNG 122 generates the same particular sequence of numbers (e.g., 10845, 68754, 19358, etc.). In other words, the outputs of the RNG 122 are predictable with knowledge of the seed value on which the outputs are based.

The example browsing tracker 104 of FIG. 2 includes a sequence calculator 206 to determine a sequence of numbers to be generated by the example RNG 122 given a seed value (e.g., the seed value generated by the example seed generator 204). When the seed generator 204 generates a seed value to be provided to, for example, the RNG 122 as described above, the seed generator 204 also conveys the seed value to the example sequence calculator 206. In the illustrated example of FIG. 2, the sequence calculator 206 includes one or more RNGs and/or emulates an operation of one or more RNGs to calculate the expected sequence of numbers to be generated given the received seed value. The example sequence calculator 206 of FIG. 2 calculates a number sequence for different types of RNGs due to the different RNGs that may be implemented in connection with different browsers. The example sequence calculator 206 stores the calculated sequence(s) of numbers in a lookup table database 208 in connection with the respective seed value on which the respective sequence was calculated. Example entries of the example lookup table database 208 of FIG. 2 are shown in a table 300 of FIG. 3.

Figure 3:
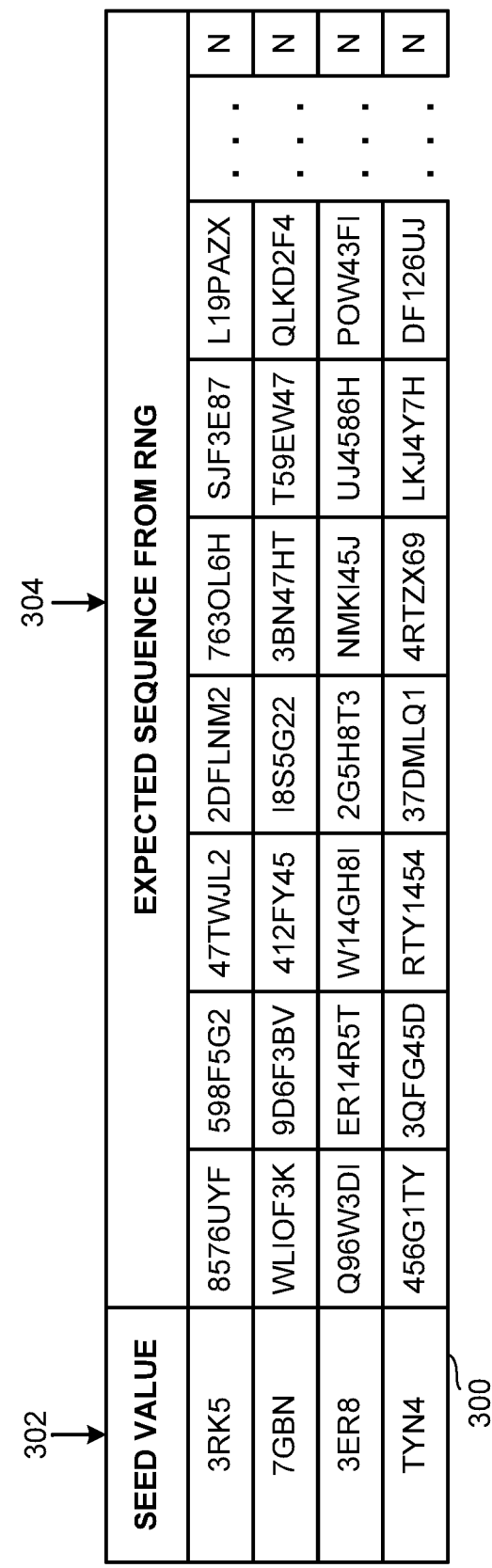
FIG. 3 is a table including example entries of the example lookup table of FIG. 2.

The example table 300 of FIG. 3 includes a first column 302 that lists seed values generated by the example seed generator 204 of FIG. 2. The example table 300 of FIG. 3 also includes a second column 304 that lists an expected sequence of numbers to be generated by an RNG for each seed value of the first column 302. In the illustrated example of FIG. 3, the seed values and the expected numbers are alphanumeric strings. However, any type of seed value and/or generated number can be utilized in connection with the example browsing tracker 104 of FIG. 2.

With reference to FIG. 3, a first seed value of '3RK5' is generated by the example seed generator 204 of FIG. 2 and conveyed to the sequence calculator 206. The example sequence calculator 206 of FIG. 2 determines that the expected RNG numbers given the first seed value are, in order, '8576UYF,' '598F5G2,' '47TWJL2,' '2DFLNM2,' '763OL6H,' 'SJF3E87,' 'L19PAZX,' '51KLO36,' etc. Thus, an initial output of the RNG given the first seed value of '3RK5' is '8576UYF.' When a browser seeded with the seed value '3RK5' navigates away from the initially requested (e.g., to start the browsing session) address to a second address with a tag, the instructions provided by the tag cause that browser to call the corresponding RNG, which outputs '598F5G2.' This process continues until, for example, the first browsing session is terminated (e.g., a user closes the current instance of the browser) or until no more tagged resources are visited. As described in detail below, the example sequence calculator 206 of FIG. 2 enables the browsing tracker 104 to know that the RNG output '598F5G2' corresponds to a second address visited by a browser that received the seed value '3RK5.'

When a second browsing session is opened (on the same user device or a different user device as the first browsing session), a second seed value of '7GBN' is generated by the example seed generator 204 of FIG. 2 and conveyed to the example sequence calculator 206. The example sequence calculator 206 of FIG. 2 determines that the expected RNG numbers given the second seed value are, in order, 'WLIOF3K,' '9D6F3BV,' '412FY45,' '18S5G22,' '3BN47HT,' 'T59EW47,' 'QLKD2F4,' 'H93DCRI,' etc. Thus, an initial output of the RNG given the first seed value of '7GBN' is 'WLIOF3K.' Each time a browser seeded with the seed value '7GBN' navigates to a new address, the instructions provided by the example instruction generator 202 of FIG. 2 cause that browser to call the corresponding RNG, which generates the sequence of numbers shown in FIG. 3. This process continues until, for example, the second browsing session is terminated (e.g., a user closes the current instance of the browser). Thus, the example sequence calculator 206 of FIG. 2 enables the browsing tracker 104 to know that the RNG output '3BN47HT' corresponds to a fifth address visited by a browser that received the seed value '7GBN.'

The example table of FIG. 3 emulates one particular type of RNG. Other tables using the same seed values are generated to represent other types of RNGs.

In the illustrated example of FIG. 2, the instructions generated by the generator 202 also cause the browser 116 to associate the RNG output with the requested (and tagged) address that caused the browser 116 to call the RNG 122. For example, the instructions provided by the example generator 202 cause the browser 116 to append or combine identifying information (e.g., a URL) for the tagged address with the number output by the RNG 122. As a result, when the browser 116 requests data from a tagged web address (e.g., the first address 120 of FIG. 1), the RNG 122 produces the next number in its expected sequence of numbers and that number is associated with the tagged web address. The instructions provided by the example generator 202 of FIG. 2 cause the browser 116 to convey the number generated by the RNG 122 and the associated web address to the browsing tracker 104. In the illustrated example, the instructions cause the browser 116 to submit an HTTP request to the browsing tracker 104 with the payload of the HTTP request including the number generated by the RNG 122 and the associated address identifier. The example instructions can cause the browser 116 to transmit the RNG output and the associated address identifier using additional or alternative message types and/or techniques (e.g., POST messages).

The example browsing tracker 104 of FIG. 2 includes an analyzer 210 to analyze data received as a result of execution of the instructions provided by the example generator 202 of FIG. 2 (e.g., via the communication interface 200). The received data, which includes an RNG output and an address identifier, is referred to herein as a tracking package. The example analyzer 210 of FIG. 2 extracts the components of the tracking package from, for example, a payload of a received HTTP message. Additional or alternative extraction techniques can be utilized by the example analyzer 210.

In the illustrated example, the analyzer 210 analyzes the RNG output of a received tracking package to determine whether the tracking package corresponds to an initiation of a browsing session. As shown in FIG. 3, the example browsing tracker 104 has knowledge of numbers that would be generated by an RNG had the RNG been provided a seed value generated by the example seed generator 204. In particular, the example lookup table database 208 includes number sequences expected to be generated by RNGs given the seed values generated by the seed generator 204. The example analyzer 210 compares the extracted RNG output of the received tracking package to the contents of the lookup table database 208. If the example lookup table database 208 includes the RNG output extracted from the tracking package, the example analyzer 210 of FIG. 2 determines that the received tracking package does not correspond to an initiation of a browsing session. The example analyzer 210 of FIG. 2 makes such a determination because if a browser sends back a random number expected from a seeding of an RNG with a seed value provided by the seed generator 204, that browser is highly likely (e.g., with a negligible margin of error due to the high amount of possible random numbers, which may be in the order of the tens of millions or more) to have generated the random number in response to receiving a seed value from the example browsing tracker 104. If so, the browser had already visited at least a first and second page in the browsing session.

On the other hand, if the example lookup table database 208 does not include the RNG output extracted from the tracking package, the example analyzer 210 of FIG. 2 determines that the received tracking package corresponds to an initiation of a browsing session. The example analyzer 210 of FIG. 2 makes such a determination because if a browser sends back a random number not expected from a seeding of an RNG with a seed value provided by the seed generator 204, that browser did not (e.g., with a negligible margin of error due to the high amount of possible random numbers, which may be in the order of the tens of millions or more) generate the random number in response to receiving a seed value from the example browsing tracker 104. Therefore, the extracted RNG output from the received tracking package was generated by a browser before it received a seed value from the example seed generator 204 and, thus, is likely to have visited only an initial page of a browsing session.

When the example analyzer 210 determines that the received tracking package corresponds to an initiation of a browsing session, the example analyzer 210 triggers the seed generator 204 to generate a new (e.g., one that has not been provided to any browser or is being reused after a sufficient length of time to conclude that the prior browsing session is finished) seed value for conveyance to the browser 116 that provided the tracking package. The example seed generator 204 provides the new seed value to the browser 116 and instructs the browser 116 to seed the RNG 122 with the new seed value. In response to the seed instructions provided by the example seed generator 204, the example RNG 122 generates an initial output. With reference to FIG. 3, if the seed generator 204 provides a seed value of '3RK5,' the RNG 122 outputs the number '8576UYF.' As described above, when the browser 116 visits another tagged web page, the instructions provided by the example instruction generator 202 cause the RNG 122 to generate the next number in the expected sequence, which is '598F5G2' in the example of FIG. 3. The sequence calculator 206 generates an expected number sequence in the example lookup table database 208 corresponding to the pseudo-random numbers to be generated by the RNG 122 during the current browsing session given the new seed value. When the extracted RNG output from the received tracking package is indicative of an initiation of a browsing session (e.g., the extracted RNG output does not belong to one of the expected sequences stored in the lookup table database 208), the example analyzer 210 of FIG. 2 discards the received RNG output. Instead, the example analyzer 210 treats the first expected number in the expected sequence calculated by the sequence calculator 206 as the number tied to the extracted address identifier of the received tracking package.

The example analyzer 210 of FIG. 2 stores the information extracted from the received tracking package in a log database 212. Example entries of the example log database 212 of FIG. 2 are shown in a table 400 of FIG. 4. The example table 400 of FIG. 4 includes a first column 402 that lists received RNG outputs received at the browsing tracker 104 from user device(s) (e.g., the first or second user devices 108, 114 of FIG. 1). The example table 400 of FIG. 4 also includes a second column 404 that lists identifying information associated with the network address that caused the corresponding RNG output to be generated and conveyed to the browsing tracker 104. In the illustrated example of FIG. 4, the received RNG outputs are alphanumeric strings and the identifying information associated with the corresponding addresses are URLs. However, any type of number or string and/or identifying information can be utilized in the example log database 212 of FIG. 2 and/or, more generally, the browsing tracker 104.

The example browsing tracker 104 of FIG. 2 includes a grouper 214 to group data of the log database 212 such that each group represents a browsing session performed by a browser (e.g., the browser 116 of FIG. 1). Results of the analysis performed by the example grouper 214 on the content of the log database 212 are stored in a browsing session information database 216. In the illustrated example, the grouper 214 retrieves a first one of the RNG outputs of the log database 212. For example, when analyzing the table 400 of FIG. 4, the grouper 214 retrieves the RNG number '8576UYF' from the first entry of the table 400. The example grouper 214 of FIG. 2 queries the example lookup table 300 of FIG. 3 with the retrieved RNG number. Through this query, the example grouper 214 of FIG. 2 determines that the RNG number '8576UYF' corresponds to a first data request of a first browsing session that received the seed value '3RK5.' Using the log database 212, the example grouper 214 of FIG. 2 also recognizes that RNG number '8576UYF' corresponds to a request for information from an online resource having the URL 'www.cnn.com/homepage.' Therefore, the example grouper 214 of FIG. 2 knows that a browser of a user device visited the web page found at 'www.cnn.com/homepage' as a visited site of the first browsing session.

Figure 5:
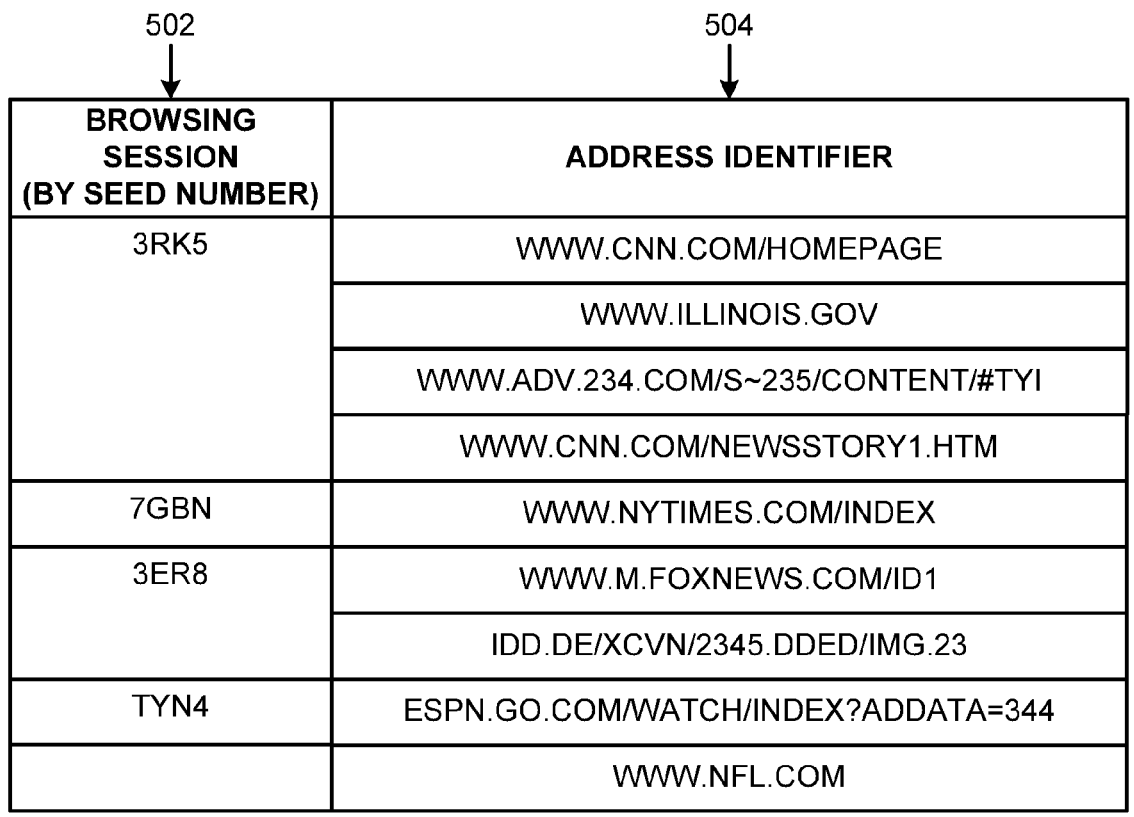
FIG. 5 is a table including example entries of the example browsing session information database of FIG. 2.

In the illustrated example of FIG. 2, the grouper 214 stores the results in the browsing session information database 216. Example entries of the browsing session information database 216 are shown in an example table 500 of FIG. 5. The example table 500 of FIG. 5 includes a first column 502 having seed values retrieved via querying the lookup table database 208. In the illustrated example, the seed values of the first column 502 are used to identify browsing sessions. The example table 500 of FIG. 5 also includes a second column 504 including address identifiers, each associated with an online resource that was accessed during the corresponding browsing session and positioned in accordance with the relative time it was accessed. To continue the above example, the grouper 214 has determined that a browser of a user device visited the web page found at 'www.cnn.com/homepage' early in a browsing session (e.g., as the first visited site) that received the seed value '3RK5.' Therefore, the grouper 214 creates a first entry in the first column 502 for the first browsing session identified by the seed value '3RK5' and an entry in a portion of the second column 504 associated with the first entry of the first column 504. The URL 'www.cnn.com/homepage' is entered into the created second column entry.

Figure 4:
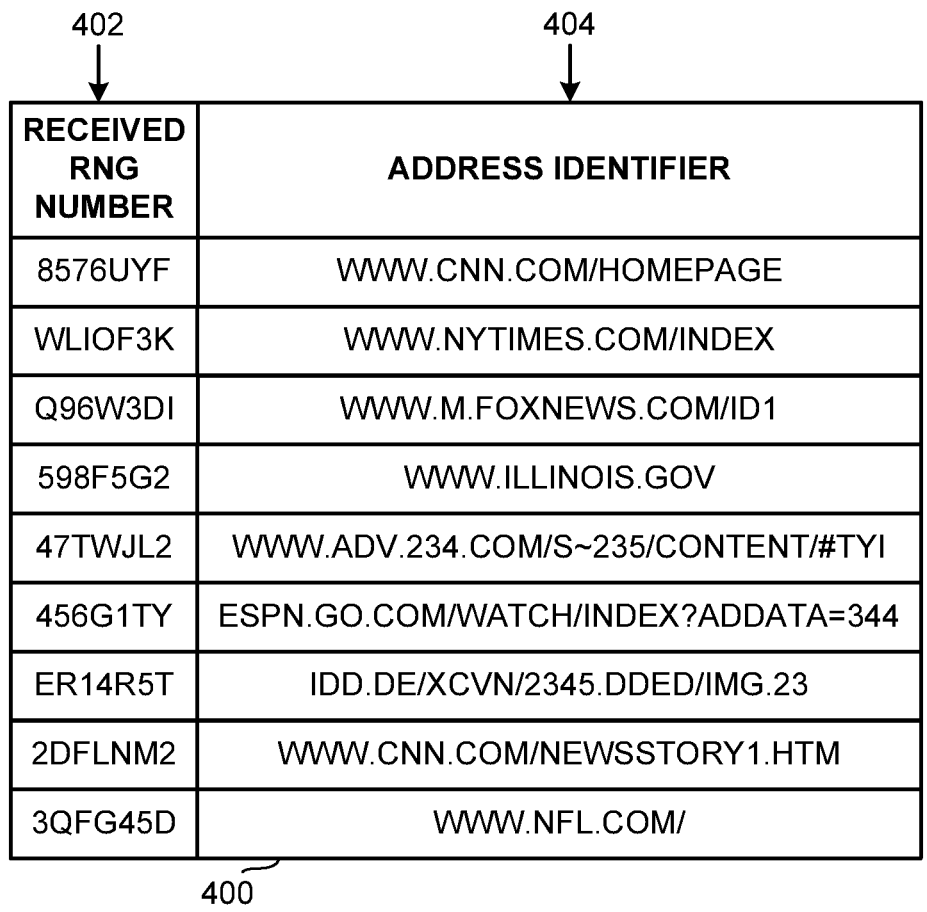
FIG. 4 is a table including example entries of the example log database of FIG. 2.

As the example grouper 214 continues to analyze the example table 400 of FIG. 4, the grouper 214 retrieves the RNG number 'WLIOF3K' and references the lookup table 300 of FIG. 3 to determine that the RNG number 'WLIOF3K' corresponds to a browsing session that received the seed value '7GBN.' The online resource is identified by 'www.nytimes.com/index.' Therefore, the example grouper 214 of FIG. 2 creates a second entry in the first column 502 to include the value '7GBN' and a corresponding entry in a portion of the second column 504 to include the URL 'www.nytimes.com/index.' In other words, the example grouper 214 has determined that a second web browsing session included requesting data from 'www.nytimes.com/index.'

As the example grouper 214 continues to analyze the example table 400 of FIG. 4, the grouper 214 retrieves the RNG number 'Q96W3DF' and references the lookup table 300 of FIG. 3 to determine that the RNG number 'Q96W3DF' corresponds to a browsing session that received the seed value '3ER8.' The online resource is identified by 'www.m.foxnews.com/ID1'. Therefore, the example grouper 214 of FIG. 2 creates a third entry in the first column 502 to include the value '3ER8' and a corresponding entry in a portion of the second column 504 to include the URL 'www.m.foxnews.com/ID1.' In other words, the example grouper 214 has determined that a third web browsing session included requesting data from www.m.foxnews.com/ID1.

As the example grouper 214 continues to analyze the example table 400 of FIG. 4, the grouper 214 retrieves the RNG number '598F5G2' and references the lookup table 300 of FIG. 3 to determine that the RNG number '598F5G2' corresponds to the browsing session that received the seed value '3RK5.' The online resource is identified by 'www.illinois.gov.' Therefore, the example grouper 214 of FIG. 2 adds a second entry in the portion of the second column 504 dedicated to the seed value '3RK5' to include the URL 'www.illinois.gov.' In other words, the example grouper 214 has determined that during the first browsing session, the browser requested data from 'www.cnn.com/homepage' and then requested data from 'www.illinois.gov.'

As the example grouper 214 continues to analyze the example table 400 of FIG. 4, the grouper 214 retrieves the RNG number '47TWJL2' and references the lookup table 300 of FIG. 3 to determine that the RNG number '47TWJL2' corresponds to a browsing session that received the seed value '3RK5.' The online resource is identified by 'www.adv.234.com/s-235/content/#tyi.' Therefore, the example grouper 214 of FIG. 2 adds a third entry in the portion of the second column 504 dedicated to the seed value '3RK5' to include the URL 'www.adv.234.com/s-235/content/#tyi.' In other words, the example grouper 214 has determined that during the first browsing session labeled "3RK5, the browser requested data from 'www.cnn.com/homepage,' then requested data from 'www.illinois.gov,' and then requested data from 'www.adv.234.com/s-235/content/#tyi.'

As the example grouper 214 continues to analyze the example table 400 of FIG. 4, the grouper 214 retrieves the RNG number '456G1TY' and references the lookup table 300 of FIG. 3 to determine that the RNG number '456G1TY' corresponds to a browsing session that received the seed value 'TYN4.' The online resource is identified by 'espn.go.com/watch/index?addata=344.' Therefore, the example grouper 214 of FIG. 2 creates a third entry in the first column 502 to include 'TYN4' and a corresponding entry in a portion of the second column 504 to include the URL 'espn.go.com/watch/index?addata=344.' In other words, the example grouper 214 has determined that during the fourth browsing session labeled 'TYN4', the browser requested data from 'espn.go.com/watch/index?addata=344' as an initial request.

As the example grouper 214 continues to analyze the example table 400 of FIG. 4, the grouper 214 retrieves the RNG number 'ER14R5T' and references the lookup table 300 of FIG. 3 to determine that the RNG number 'ER14R5T' corresponds to a browsing session that received the seed value '3ER8.' The online resource is identified by 'idd.de/xcvn/2345.dded/img.23.' Therefore, the example grouper 214 of FIG. 2 adds a second entry in the portion of the second column 504 dedicated to the seed value '3ER8' to include the URL 'idd.de/xcvn/2345.dded/img.23.' In other words, the example grouper 214 has determined that during the third browsing session labeled '3ER8', the browser requested data from 'www.m.foxnews.com/ID1' and then requested data from 'idd.de/xcvn/2345.dded/img.23.'

As the example grouper 214 continues to analyze the example table 400 of FIG. 4, the grouper 214 retrieves the RNG number '2DFLNM2' and references the lookup table 300 of FIG. 3 to determine that the RNG number '2DFLNM2' corresponds to a browsing session that received the seed value '3RK5.' The online resource is identified by 'www.cnn.com/newsstory1.htm.' Therefore, the example grouper 214 of FIG. 2 adds a fourth entry in the portion of the second column 504 dedicated to the seed value '3RK5' to include the URL 'www.cnn.com/newsstory1.htm.' In other words, the example grouper 214 has determined that during the first browsing session labeled '3RK5', the browser requested data from 'www.cnn.com/homepage,' then requested data from 'www.illinois.gov,' then requested data from 'www.adv.234.com/s-235/content/#tyi,' and then requested data from 'www.cnn.com/newsstory1.htm.'

As the example grouper 214 continues to analyze the example table 400 of FIG. 4, the grouper 214 retrieves the RNG number '3QFG45D' and references the lookup table 300 of FIG. 3 to determine that the RNG number '3QFG45D' corresponds to the browsing session that received the seed value 'TYN4.' The online resource is identified by 'www.nfl.com.' Therefore, the example grouper 214 of FIG. 2 adds a second entry in the portion of the second column 504 dedicated to the seed value 'TYN4' to include the URL 'www.nfl.com.' In other words, the example grouper 214 has determined that during the fourth browsing session labeled 'TYN4', the browser requested data from 'espn.go.com/watch/index?addata=344' and then requested data from 'www.nfl.com.'

The example grouper 214 of FIG. 2 continues to analyze the example table 400 of FIG. 4 to gather browsing session information. In some examples, the grouper 214 is executed periodically according to a schedule. In some examples, the grouper 214 is executed in response to the log database 212 having a threshold amount of data or entries. In some examples, the grouper 214 is executed continuously to constantly analyze data of the log database 212. As a result of the analysis performed by the example grouper 214, the example browsing session information database 216 of FIG. 2 includes chronological lists of online resources that were visited during respective browsing sessions.

While an example manner of implementing the browsing tracker 104 of FIG. 1 has been illustrated in FIG. 2, one or more of the elements, processes and/or devices illustrated in FIG. 2 may be combined, divided, re-arranged, omitted, eliminated and/or implemented in any other way. Further, the example communication interface 200, the example instruction generator 202, the example seed generator 204, the example sequence calculator 206, the example analyzer 210, the example grouper 214 and/or, more generally, the example browsing tracker 104 of FIG. 2 may be implemented by hardware, software, firmware and/or any combination of hardware, software and/or firmware. Thus, for example, any of the example communication interface 200, the example instruction generator 202, the example seed generator 204, the example sequence calculator 206, the example analyzer 210, the example grouper 214 and/or, more generally, the example browsing tracker 104 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communication interface 200, the example instruction generator 202, the example seed generator 204, the example sequence calculator 206, the example extractor 210, the example grouper 214 and/or, more generally, the example browsing tracker 104 of FIG. 2 are hereby expressly defined to include a tangible computer readable medium such as a memory, DVD, CD, Blu-ray, etc. storing the software and/or firmware. Further still, the browsing tracker 104 of FIG. 2 may include one or more elements, processes and/or devices in addition to, or instead of, those illustrated in FIG. 2, and/or may include more than one of any or all of the illustrated elements, processes and devices.

Figure 6:
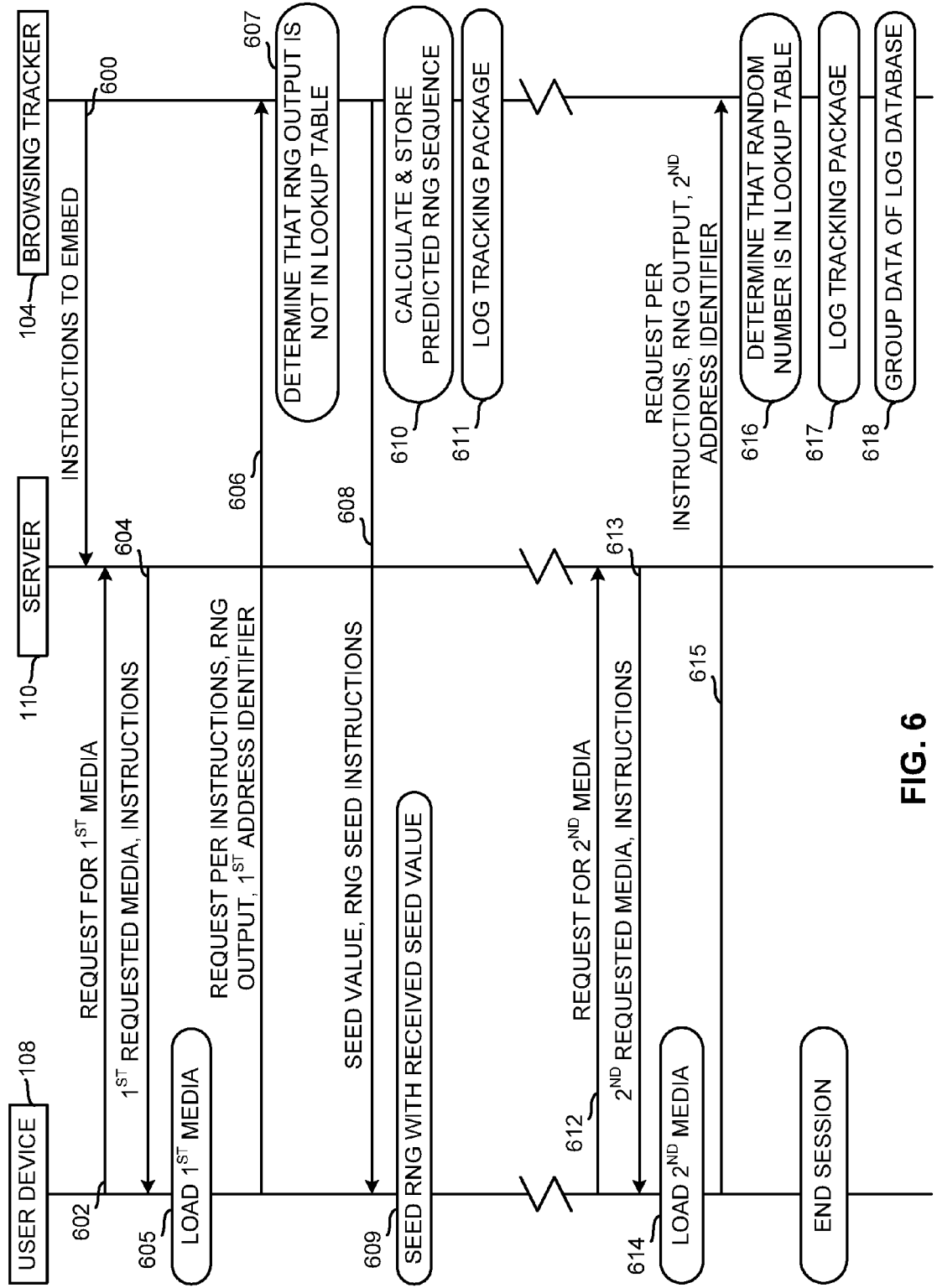
FIG. 6 is a communication diagram illustrating a first example communication sequence associated with the example browsing tracker of FIGS. 1 and/or 2.

FIG. 6 demonstrates example communications between the example browsing tracker 104 of FIGS. 1 and/or 2, the first server 110 of FIG. 1 and the first user device 108 of FIG. 1. Similar communication exchanges to those of FIG. 6 can occur between the example browsing tracker 104 and any other user device(s) and/or server(s). In the illustrated example of FIG. 6, the audience measurement entity 102 of FIG. 1 (e.g., via the communication interface 200 of the browsing tracker 104) provides instructions 600 to the first server 110.

In particular, the example instruction generator 202 of FIG. 2 generates the instructions and provides the same to the first server 110. An operator of the first server 110 (e.g., a database proprietor) embeds the instructions 600 into one or more of the addresses 118 hosted by the first server 110. When the browser 116 of the first user device 108 submits a request 602 to the first server 110 for one of the addresses 118 in which the instructions 600 is embedded (e.g., a tagged web page), the first server 110 sends a response 604 to the first user device 108 including the resource of the requested address and the embedded instructions. The browser 116 of the first user device 108 loads the requested media by, for example, rendering a web page onto a display associated with the first user device 108 (block 605). Additional or alternative methods of providing the browser 116 with the instructions 600 are available such as, for example, embedding beacon code pointing to the instructions 600.

In the illustrated example of FIG. 6, the instructions 600 downloaded onto the first user device 108 in response to the request 602 includes instructions disclosed herein to cause the browser 116 to generate a random number and to send a tracking package including the generated random number and a network address identifier to the browsing tracker 104. Per the instructions 600 provided to the first user device 108 in response to the first request 602, the browser 116 sends a tracking package 606 to the browsing tracker 104. In some examples, the instructions 600 causes the browser 116 to send the tracking package 606 by providing a network address at which the browsing tracker 104 (e.g., the communication interface 200 of FIG. 2) can be reached. The tracking package 606 assembled and sent by the browser 116 includes an output of the RNG 122 and a network address identifier associated with the media retrieved via the first request 602. Using the RNG output of the tracking package 606, the example analyzer 210 of FIG. 2 determines whether the first request 602 is associated with an unknown browsing session (e.g., corresponds to an initiation of a web browsing session). As described above, the example analyzer 210 makes this determination by comparing the RNG output of the tracking package 606 to the content of the lookup table database 208. If the RNG output of the tracking package 606 is found in the lookup table database 208, the example analyzer 210 of FIG. 2 determines that the request 602 does not correspond to a known browsing session. On the other hand, if the RNG output of the tracking package 606 is found in the lookup table database 208, the example analyzer 210 of FIG. 2 determines that the request 602 corresponds to a known browsing session. In the illustrated example, the request 602 is the first request of a browsing session and, thus, the RNG output of the tracking package 606 is not found in the lookup table database 208 (block 607). Accordingly, the example analyzer 210 triggers the example seed generator 204 to generate and send a new seed value and instructions 608 to seed the RNG 122 with the new value to the browser 116. The browser 116 seeds the RNG 122 with the received new seed value (block 609). At about the same time, the example sequence calculator 206 calculates and stores the expected number sequence from the RNG 122 and stores the results in the lookup table database 208 (block 610). The example analyzer 210 also stores an entry in the log database 212 including the address identifier from the tracking package 606 along with the first expected number from the expected number sequence calculated by the sequence calculator 206 for the seed value provided by the example seed generator 204 (block 611). Had the received RNG output of the tracking package 606 not corresponded to a known browsing session, the analyzer 210 would have logged the received RNG output of the tracking package 606 with the address identifier of the tracking package 606.

In the illustrated example of FIG. 6, the browser 116 of the first user device 108 sends, during the same browsing session as the first request 602, a second request 612 to the first server 110 for second media (e.g., a web page) in which the instructions 600 generated by the example instruction generator 202 of FIG. 2 is embedded (e.g., a tagged web page). The second media may correspond to a web page in a same or a different domain as the web page requested in the first request 602. The first server 110 responds to the second request 612 with the embedded instructions and the requested media 613. The browser 116 loads the requested media 613 and executes instructions of the tag (block 614). As a result, the browser 116 calls the RNG 122. Because the RNG 122 was seeded with the seed value sent at 608 provided by the browsing tracker 104 and because the seeding of the RNG 122 persists across visits to different web pages, the RNG 122 generates the second expected number of the corresponding number sequence stored in the lookup table database 208. The browser 116 conveys a second tracking package 615 including the resulting RNG number and an address identifier to the browsing tracker 104.

The example analyzer 210 of FIG. 2 determines whether the second tracking package 615 corresponds to a known browsing session by querying the lookup table database 208 with the RNG output of the second tracking package 615 (block 616). In the illustrated example of FIG. 6, the second request 612 is associated with a known browsing session and, thus, the analyzer 210 determines that RNG output of the second tracking package 615 is in the lookup table database 208 (block 616). As a result, the example analyzer 210 logs the received RNG output of the second tracking package 615 in the log database 212 with the address identifier of the second tracking package 615 (block 617).

The example grouper 214 identifies entries of the log database 212 that correspond to the same browsing session (block 618). As described above, for each entry in the log database 212, the example grouper 214 of FIG. 2 queries the expected number sequences of the lookup table database 208 with the respective RNG output of the log database 212 to determine which of the seed values provided by the seed generator 204 caused generation of the respective RNG output. With the query results, the example grouper 214 groups together the network address identifiers corresponding to RNG outputs that were generated based on the same seed value. The example grouper 214 stores the groups in the browsing session information database 216. While shown as occurring after the analyzer 210 logs the second tracking package 615 in FIG. 6, the example grouper 214 can perform the operations disclosed herein at any suitable time and/or according to any suitable schedule.

Figure 7:
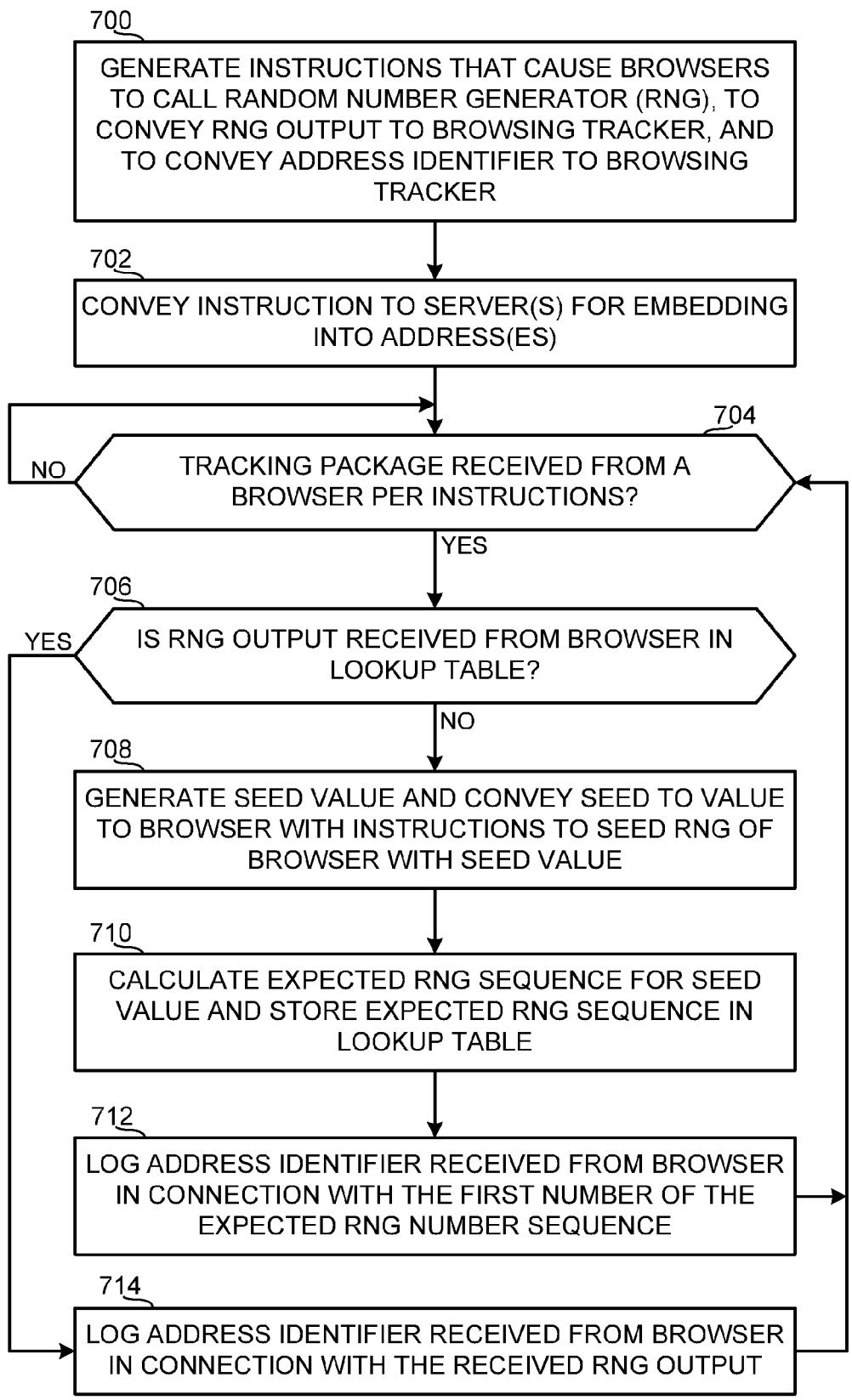
FIG. 7 is a first flowchart illustrating example machine readable instructions that may be executed to implement the example browsing tracker of FIGS. 1 and/or 2.

A first flowchart representative of example machine readable instructions for implementing the example browsing tracker 104 of FIGS. 1 and/or 2 is shown in FIG. 7. The example of FIG. 7 begins with the example instruction generator 202 of FIG. 2 generating instructions that cause browsers to take a plurality of actions in response to requesting media from a resource (e.g., web page) tagged with the instructions. In particular, the instructions generated by the example instruction generator 202 cause the receiving browser to call a native RNG, convey an output of the RNG to the browsing tracker 104, convey an address identifier to the browsing tracker 104 (block 700). The information provided to the browsing tracker 104 by browsers in accordance with the instructions provided by the example instruction generator 202 is referred to herein as a tracking package.

In the illustrated example of FIG. 7, the browsing tracker 104 conveys the instructions to one or more servers (e.g., the first and/or second servers 110, 112 of FIG. 1) to be embedded into one or more addresses hosted by the server(s) (e.g., one or more of the addresses 118 of FIG. 1) (block 702). As described above, the one or more addresses can additionally or alternatively be embedded with beacon code that points to a server storing the instructions. In such instances, the beacon code causes the browser 116 to request (e.g., by sending an HTTP request) the instructions generated by the instruction generator 202 from the server, which returns the instructions that cause the browser 116 to take the actions described above in connection with block 700.

When a tracking package is received at the browsing tracker 104 (block 704), the example analyzer 210 of FIG. 1 determines whether the RNG output of the received tracking package indicates that the tracking package corresponds to a known browsing session by querying the lookup table database 208 (block 706). If the RNG output is not found in the lookup table database 208, the example seed generator 204 of FIG. 2 generates a seed value and conveys the seed value to the browser along with instructions to seed the native RNG of the browser with the seed value (block 708). The example sequence calculator 206 of FIG. 2 calculates an expected sequence of numbers to be generated by the corresponding RNG given the generated seed value (block 710). The expected number sequence is stored in the example lookup table 208 of FIG. 2. With reference to FIG. 3, the example table 300 shows a plurality of seed values 302 and the respective expected sequence of RNG numbers 304 for each of the seed values 302 calculated by the example sequence calculator 206 of FIG. 2. The example browsing tracker 104 logs the address identifier of the received tracking package along with the first number of the calculated expected number sequence in the log database 212 (block 712). Control then returns to block 704.

Referring back to block 706, if the RNG output of the received tracking package is found in the lookup table database 208, the analyzer 210 determines that the tracking package does correspond to a known browsing session and control passes to block 714. In particular, the example analyzer 210 logs the address identifier and the RNG output of the received tracking package in the log database 212. Control then returns to block 704.

Figure 8:
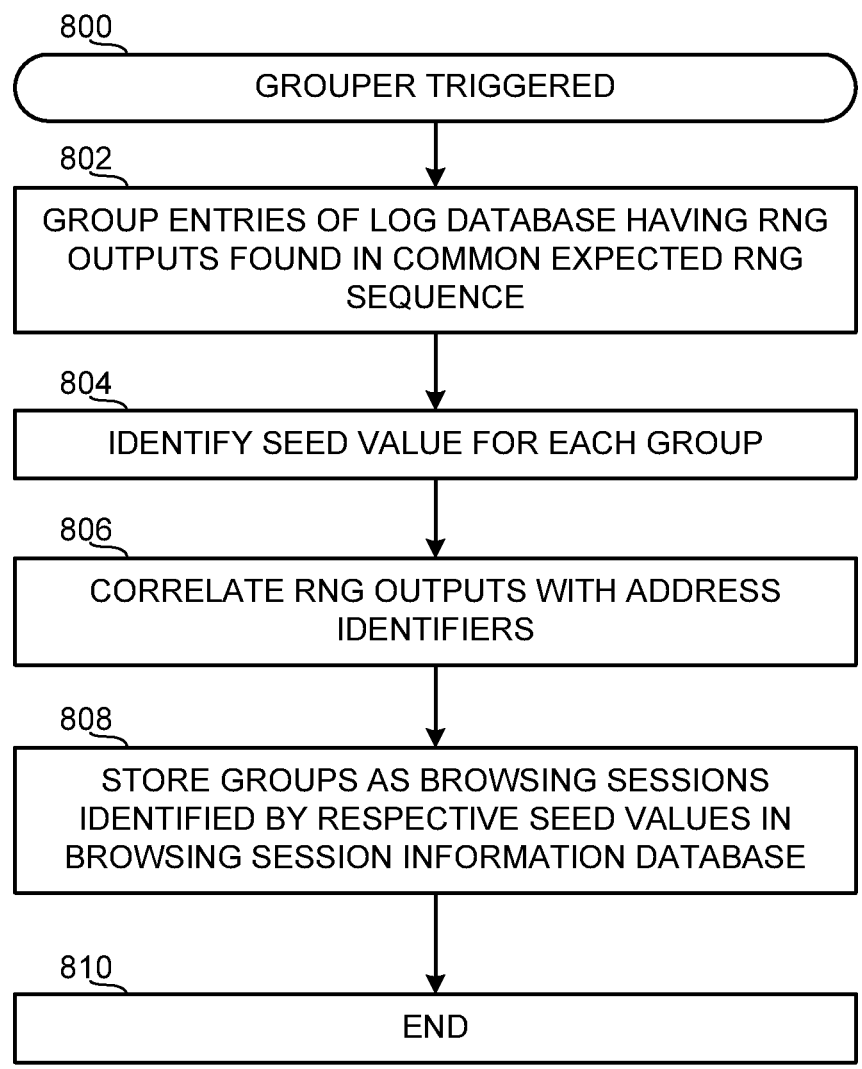
FIG. 8 is a flowchart illustrating example machine readable instructions that may be executed to implement the example grouper of FIG. 2.

A flowchart representative of example machine readable instructions for implementing the example grouper 214 of FIG. 2 is shown in FIG. 8. The example of FIG. 8 begins with a trigger of the example grouper 214 (block 800). In the illustrated example, the grouper 214 is triggered in accordance with a schedule. However, the example grouper 214 of FIG. 2 can be triggered in alternative manners, such as in response to a certain amount of data being stored in the log database 212. As described above in connection with FIGS. 2 and 4, for each of the RNG outputs of the log database 212, the grouper 214 identifies which of the expected number sequences of the lookup table 208 includes the respective RNG output. The entries of the log database 212 found in the same number sequence of the lookup table database 208 are grouped by the example grouper 214 of FIG. 2 (block 802). For each group, the example grouper 214 references the lookup table 208 to determine which seed value corresponds to the expected number sequence for that group (block 804).

With the knowledge of the seed value corresponding to each analyzed RNG number, the example grouper 214 correlates the address identifying information (e.g., of the second column 404 of FIG. 4) with the corresponding received RNG outputs (block 806). The resulting data structure (e.g., the example table 500 of FIG. 5) is stored in the browsing session information database 216 (block 808). The example of FIG. 8 then ends (block 810).

Figure 9:
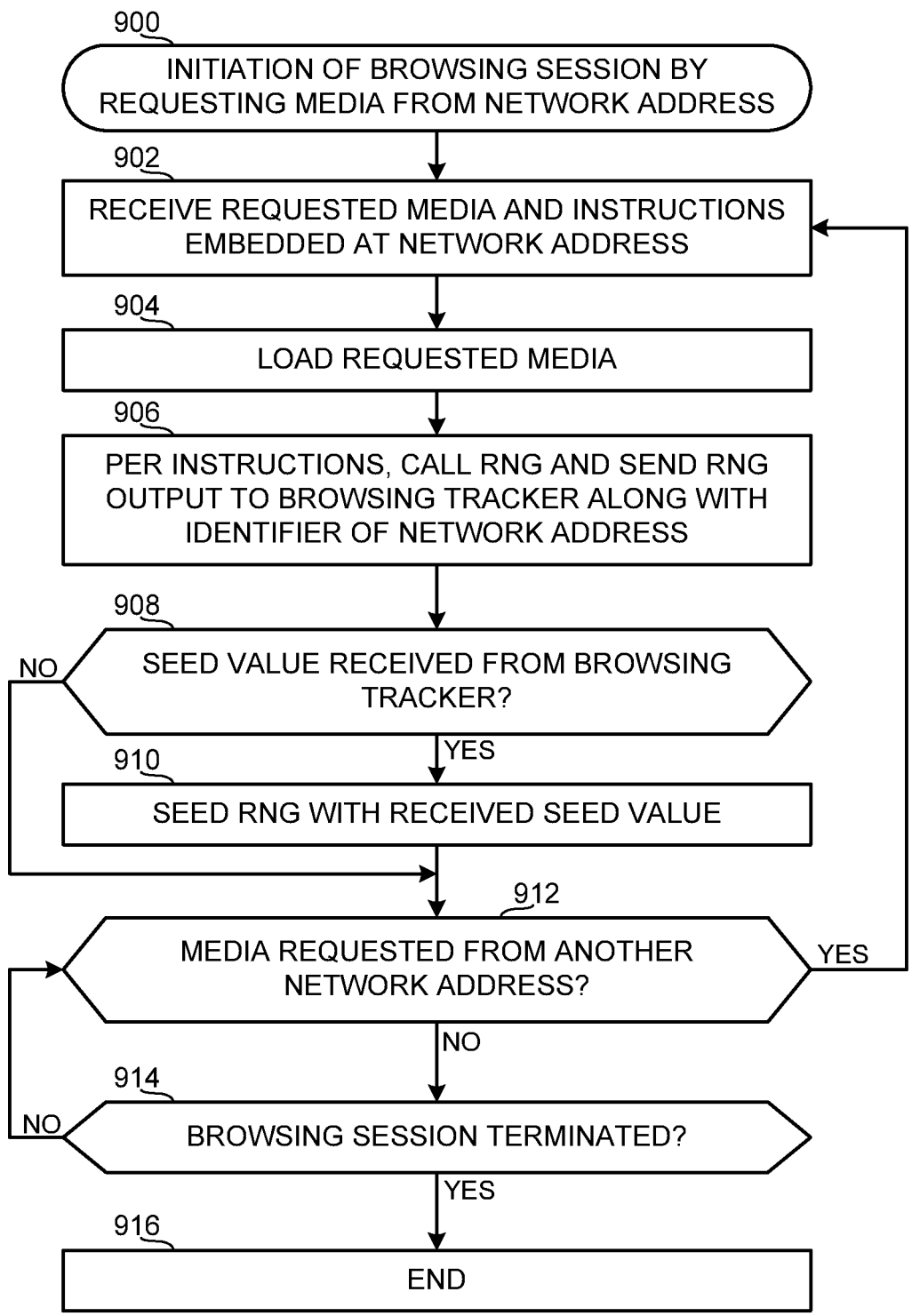
FIG. 9 is a flowchart illustrating example machine readable instructions that may be executed to implement the example browser of FIG. 1.

A flowchart representative of example machine readable instructions for implementing the example browser 116 of FIG. 1 is shown in FIG. 9. The example of FIG. 9 begins with the browser 116 initiating a browsing session by requesting media from a network address hosted by a server (e.g., the first server 110 of FIG. 1) (block 900). In the illustrated example, the browser 116 receives instructions provided by the example instruction generator 202 of FIG. 2 as a result of the instructions being embedded (e.g., via the tag 121 of FIG. 1) in the requested network media (block 902). The browser 116 loads the requested media on the first user device 108 (e.g., by displaying the web page on a display device) (block 904).

Further, per the instructions provided by the example instruction generator 202 of FIG. 2, the example browser 116 calls the RNG to generate a random number and conveys a tracking package including the RNG output and a network address identifier associated with the requested network media to the browsing tracker 104 (block 906). As described above, the example browsing tracker 104 returns a seed value for the RNG 122 if the request corresponds to an unknown browsing session. If such a seed value is received at the browser 116 from the browsing tracker 104 (block 908), the browser 116 seeds the RNG 122 with the received seed value (block 910) and control proceeds to block 912. Otherwise, control passes from block 908 to block 912. When seeded with a seed value generated by the example seed generator 204 of FIG. 2, the browser 116 calls the RNG 122 throughout the browsing session with the provided seed value as the original basis for the random number algorithm.

At block 912, when the example browser 116 requests media from another address, control returns to block 902. Otherwise, the example of FIG. 9 ends (block 916) if the browsing session has been terminated (block 914).

In the example flowcharts of FIGS. 7-9, the machine readable instructions comprise program(s) for execution by a processor such as the processor 1012 shown in the example computer 1000 discussed below in connection with FIG. 10. The program(s) may be embodied in software stored on a tangible computer readable medium such as a CD-ROM, a floppy disk, a hard drive, a digital versatile disk (DVD), a Blu-ray disk, or a memory associated with the processor 1012, but the entire program and/or parts thereof could alternatively be executed by a device other than the processor 1012 and/or embodied in firmware or dedicated hardware. Further, although the example program(s) is described with reference to the flowcharts illustrated in FIGS. 7-9, many other methods of implementing the example browsing tracker 104 may alternatively be used. For example, the order of execution of the blocks may be changed, and/or some of the blocks described may be changed, eliminated, or combined.

As mentioned above, the example processes of FIGS. 7-9 may be implemented using coded instructions (e.g., computer readable instructions) stored on a tangible computer readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 8 and/or 9 may be implemented using coded instructions (e.g., computer readable instructions) stored on a non-transitory computer readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. As used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 10:
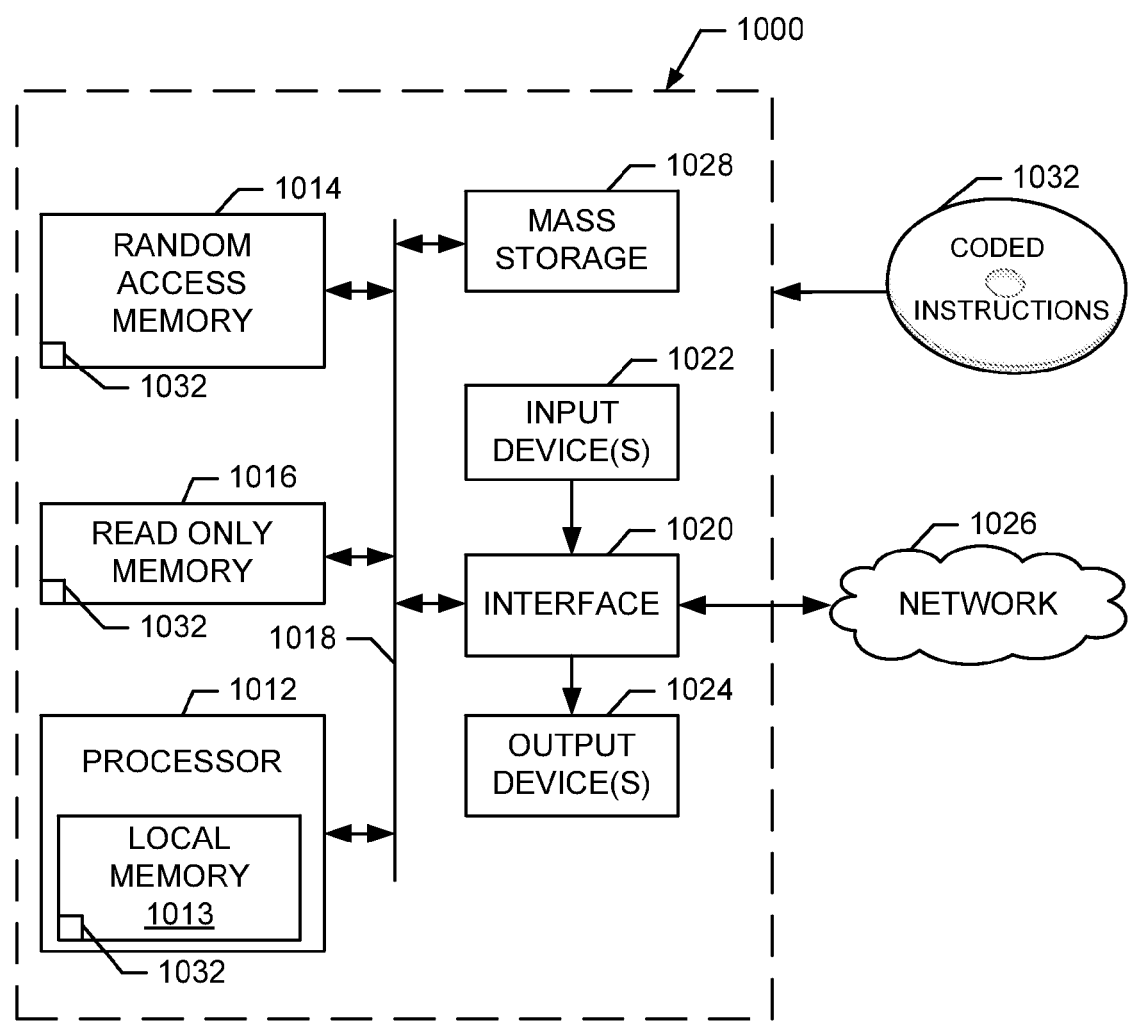
FIG. 10 is a block diagram of an example processor platform which may execute the example machine readable instructions of FIG. 7 to implement the example browsing tracker of FIGS. 1 and/or 2, the example machine readable instructions of FIG. 8 to implement the example grouper of FIG. 2, and/or the example machine readable instructions of FIG. 9 to implement the example browser of FIG. 1.

FIG. 10 is a block diagram of an example computer 1000 capable of executing the instructions of FIGS. 8 and/or 9 to implement the example browsing tracker 104 of FIGS. 1 and/or 2. The example computer 1000 is also capable of executing the instructions of FIG. 10 to implement the example browser 116 of FIG. 1. The computer 1000 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 1000 of the instant example includes a processor 1012. For example, the processor 1012 can be implemented by one or more microprocessors or controllers from any desired family or manufacturer.

The processor 1012 includes a local memory 1013 (e.g., a cache) and is in communication with a main memory including a volatile memory 1014 and a non-volatile memory 1016 via a bus 1018. The volatile memory 1014 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1016 may be implemented by flash memory and/or any other desired type of memory device. Access to the main memory 1014, 1016 is controlled by a memory controller.

The computer 1000 also includes an interface circuit 1020. The interface circuit 1020 may be implemented by any type of interface standard, such as an Ethernet interface, a universal serial bus (USB), and/or a PCI express interface.

One or more input devices 1022 are connected to the interface circuit 1020. The input device(s) 1022 permit a user to enter data and commands into the processor 1012. The input device(s) can be implemented by, for example, a keyboard, a mouse, a touchscreen, a track-pad, a trackball, isopoint and/or a voice recognition system.

One or more output devices 1024 are also connected to the interface circuit 1020. The output devices 1024 can be implemented, for example, by display devices (e.g., a liquid crystal display, a cathode ray tube display (CRT), a printer and/or speakers). The interface circuit 1020, thus, typically includes a graphics driver card.

The interface circuit 1020 also includes a communication device (e.g., communication interface 200) such as a modem or network interface card to facilitate exchange of data with external computers via a network 1026 (e.g., an Ethernet connection, a digital subscriber line (DSL), a telephone line, coaxial cable, a cellular telephone system, etc.).

The computer 1000 also includes one or more mass storage devices 1028 for storing software and data. Examples of such mass storage devices 1028 include floppy disk drives, hard drive disks, compact disk drives and digital versatile disk (DVD) drives. The mass storage device 1028 may implement the lookup table database 208, the log database 212, and/or the browsing session information database 216 of FIG. 2.

The coded instructions 1032 of FIGS. 7-9 may be stored in the mass storage device 1028, in the volatile memory 1014, in the non-volatile memory 1016, and/or on a removable storage medium such as a CD or DVD.

From the foregoing, it will be appreciated that disclosed methods, apparatus and articles of manufacture enable monitoring services to collect Internet traffic data without the use of cookies, without having to ascertain an IP address, and/or despite security measures that prevent monitoring services from locally storing a user identifier on user devices.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method, comprising:

receiving, at a collection facility, a first number and a first Internet address identifier, the first number generated with a first random number generator using a first seed value during a first browsing session associated with a browser, the first Internet address identifier corresponding to media that was accessed during the first browsing session;

comparing, by executing an instruction with a processor at the collection facility, the first number to a sequence of numbers generated by a second random number generator, different than the first random number generator, using the first seed value;

generating a lookup table, by executing an instruction with the processor at the collection facility, having the first seed value associated with the generated sequence of numbers;

when the first number is in the sequence of numbers, associating, by executing an instruction with the processor at the collection facility, the first Internet address identifier with the first browsing session;

receiving a second number and a second Internet address identifier;

querying the lookup table, by executing an instruction with the processor, to determine whether the second number is in the sequence of numbers; and when the second number is in the sequence of numbers, storing the second address identifier, by executing an instruction with the processor at the collection facility, in connection with the first seed value in a database, wherein an entry of the database including the first address identifier and the second address identifier indicates that the first address identifier and the second address identifier were accessed during the first browsing session.

2. The method as defined in claim 1, further including providing instructions to the browser that cause the browser to seed the first random number generator with the first seed value and to convey an output of the first random number generator to the collection facility when the first number is not in the sequence of numbers.

3. The method as defined in claim 2, wherein the providing of the instructions to the browser includes embedding the instructions in a network resource accessible to the browser.

4. The method as defined in claim 1, further including:
   determining, by executing an instruction with the processor at the collection facility, that the first address identifier was accessed before the second address identifier during the first browsing session based on occurrence of the first number in the sequence of numbers before the occurrence of the second number in the sequence of numbers, wherein the database includes an indication of the first address identifier being accessed before the second address identifier.

5. A tangible computer readable storage medium comprising instructions that, when executed, cause a machine to at least:
   receive, at a collection facility, a first number and a first address identifier, the first number generated with a first random number generator using a first seed value during a first browsing session associated with a browser, the first address identifier corresponding to media that was accessed during a first browsing session associated with a browser;
   compare, at the collection facility, the first number to a sequence of numbers generated by a second random number generator, different than the first random number generator, using the first seed value;
   generate a lookup table having the first seed value associated with the generated sequence of numbers;
   when the first number is in the sequence of numbers, associate the first address identifier with the first browsing session;
   receive a second number and a second address identifier;
   query the lookup table to determine whether the second number is in the sequence of numbers; and
   when the second number is in the sequence of numbers, store the second address identifier in connection with the first seed value in a database, wherein an entry of the database including the first address identifier and the second address identifier indicates that the first address identifier and the second address identifier were accessed during the first browsing session.

6. The computer readable medium as defined in claim 5, wherein the instructions cause the machine to, when the first number is not in the sequence of numbers, provide code to the browser that causes the browser (a) to seed the first random number generator with the first seed value and (b) to convey an output of the first random number generator to the machine.

7. The computer readable medium as defined in claim 6, wherein the instructions cause the machine to provide the code to the browser by embedding the code in a network resource accessible to the browser.

8. The computer readable medium as defined in claim 5, the instructions to cause the machine to determine that the first address identifier was accessed before the second address identifier during the first browsing session based on occurrence of the number in the sequence of numbers before occurrence of the second number in the sequence of numbers, wherein the database includes an indication of the first address identifier being accessed before the second address identifier.

9. An apparatus, comprising:
   a calculator, at a collection facility, to compute a sequence of numbers with a first random number generator using a first seed value;
   an analyzer, at the collection facility, to receive a first number and a first address identifier corresponding to a web site visit during a first browsing session associated with a browser, where the first number was generated by a second random number generator, different than the first random number generator, using the first seed value during the first browsing session;
   the analyzer to compare the first number to the sequence of numbers;
   memory to store the first address identifier in connection with the first seed value in a database when the first number is one of the sequence of numbers;
   when the first number is in the sequence of numbers, the analyzer to associate the first address identifier with the first browsing session;
   the analyzer is to:
   in response to receiving a second number and a second address identifier, query the lookup table to determine whether the second number is in the sequence of numbers; and
   when the second number is in the sequence of numbers, store the second address identifier in connection with the first seed value in the database, wherein an entry of the database including the first and second address identifiers indicates that the first and second address identifiers were accessed during the first browsing session.

10. The apparatus as defined in claim 9, further including an instruction generator to generate instructions that cause the browser to seed the second random number generator with the first seed value and to convey an output of the second random number generator to the apparatus when the first number is not in the sequence of numbers.

11. The apparatus as defined in claim 10, wherein the instruction generator is to provide the instructions to the browser by embedding the instructions in a network resource accessible to the browser.

* * * * *